United States Patent [19]

Kroha

[11] Patent Number: 4,861,474
[45] Date of Patent: Aug. 29, 1989

[54] FUEL FILTER COUPLING

[75] Inventor: John L. Kroha, Ferndale, Mich.

[73] Assignee: Flexon, Inc., Ferndale, Mich.

[21] Appl. No.: 111,491

[22] Filed: Oct. 22, 1987

[51] Int. Cl.4 .............................................. B01D 23/00
[52] U.S. Cl. .................................... 210/232; 210/249;
210/416.4; 210/446; 210/238; 285/185
[58] Field of Search ............... 210/249, 446, 232, 238,
210/416.4, 237; 285/184, 185

[56] References Cited

U.S. PATENT DOCUMENTS

| 392,032 | 10/1888 | Jacobson . | |
|---|---|---|---|
| 409,127 | 8/1889 | Taggart . | |
| 1,140,720 | 5/1915 | Simons . | |
| 1,884,869 | 10/1932 | Replogle | 285/184 |
| 2,589,136 | 3/1952 | Ralston | 210/249 |
| 3,909,221 | 9/1975 | Bengtsson | 55/314 |
| 4,040,964 | 8/1977 | Hegyi | 210/238 |
| 4,052,307 | 10/1977 | Humbert, Jr. | 210/130 |
| 4,271,020 | 6/1981 | Van Meter | 210/133 Q |
| 4,452,695 | 6/1984 | Schmidt | 210/249 |

Primary Examiner—Steve Alvo
Attorney, Agent, or Firm—Basile and Hanlon

[57] ABSTRACT

A fluid coupling including a coupling base with a fluid passage therethrough, and a rotatable fluid line supporting bracket. The bracket is adjustable depending on the direction of fluid line approach, and is fixable once a desired configuration is determined. The fluid coupling base includes an annular groove in which the pipe support bracket is rotatably engaged. The bracket may be crimped once a desired configuration is obtained, thus fixing the bracket in position on the coupling base to support the fluid line.

2 Claims, 2 Drawing Sheets

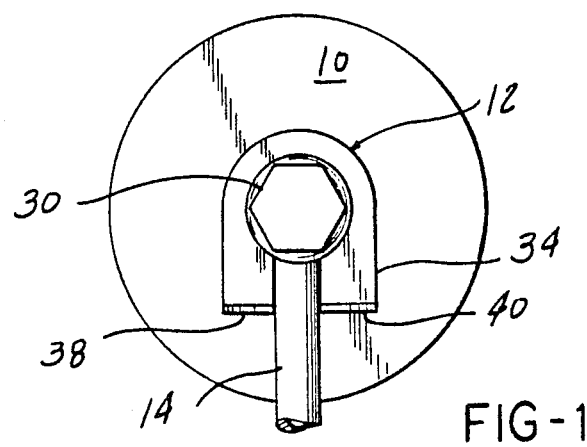
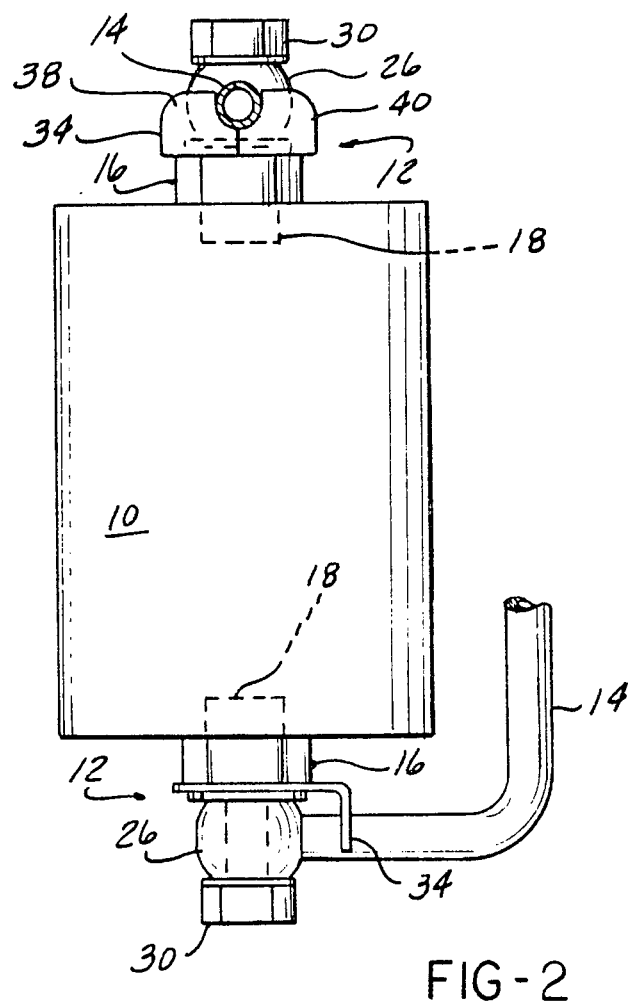

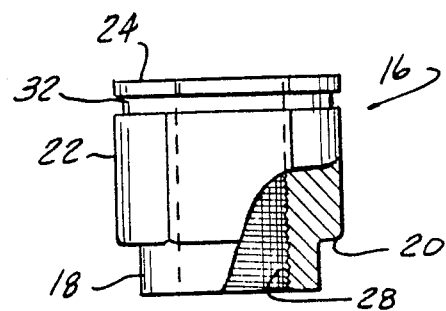
FIG-3
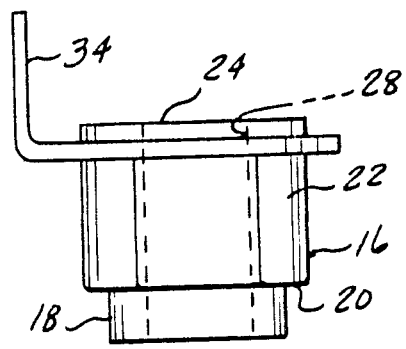
FIG-4
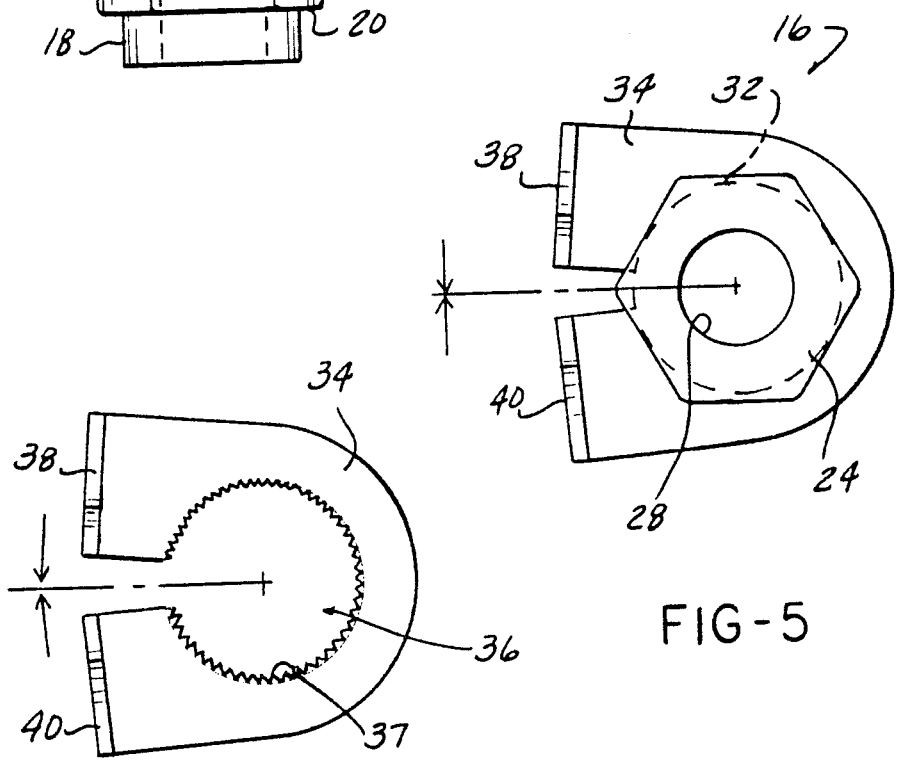
FIG-5
FIG-6

FUEL FILTER COUPLING

BACKGROUND OF THE INVENTION

1. Field of the Invention

The present invention is concerned with a fluid coupling of the type used with high pressure fluid lines for connection to fluid filters.

2. Description of the Relevant Art

Such couplings are finding increasing usage in automobile fuel injection systems which require high pressure in the fuel system. Generally, the couplings will incorporate a fuel line support for incoming or outgoing fuel lines. Prior couplings of this type use pipe supports incorporated in the couplings which are fixed, during manufacture, in a position required for a specific location of incoming or outgoing piping for the particular model of automobile in which the filter or other device is to be installed. Fixed couplings of this type necessitate numerous replacement filters with diffrently configured end fittings for each supply pipe configuration, which generally varies with each application.

The present invention is directed to a universal pipe coupling having pipe supports which may be adapted to all supply line configurations and subsequently fixed in position, thus eliminating the need to manufacture and supply a differently configured fuel filter for each model of automobile in a manufacturer's line.

SUMMARY OF THE INVENTION

In accordance with the present invention, a fluid coupling for use with a fluid filter comprises a fluid coupling base with a pipe support bracket attached thereto for supporting an incoming or outgoing line. The bracket is adjustable to accommodate fluid lines of varying configuration, and is may be fixed in position once a desired configuration is determined.

The fluid coupling base is tubular to accommodate passage of fluid therethrough, and is formed with an annular groove adjacent its outermost end and disposed around the external perimeter thereof. The pipe support bracket is mounted for rotational movement about the longitudinal axis of the coupling base. The generally plate-like pipe support bracket, preferably has a keyhole-shaped opening formed therein with the diameter of the internal radius having a diameter corresponding to the circumference of the annular groove of the fluid coupling base and large enough to allow a loose fit within the groove. A series of teeth are formed within the aperture to provide high friction between the bracket and the coupling base allowing said bracket to be fixed in position. The ends of the keyhole-shaped opening of the plate-like bracket are spaced apart and are formed to encompass at least a portion of the outer surface of a fluid line when the bracket is correctly positioned. The ends of the keyhole-shaped opening of the bracket may be moved in a direction toward each other in a crimping action, thereby effectively tightening the bracket around the coupling base and the fluid line, to support the fluid line and fix the bracket in position about the fluid coupling base. The rotational mounting of the pipe support bracket about the base allows the bracket to be positioned to accommodate all fluid line configurations, thus eliminating the need for multiple fluid filter configurations.

Other objects and features of the invention will become apparent by reference to the following specification and to the drawings.

BRIEF DESCRIPTION OF THE DRAWINGS

FIG. 1 is a top view showing a fuel filter with a coupling embodying the present invention installed and fixed in position;

FIG. 2 is a front elevational view showing a fuel filter with a coupling, disposed at each end thereof, embodying the present invention and fixed in position at different angles relative to each other;

FIG. 3 is a front elevational view, partially broken away, of a fluid coupling base;

FIG. 4 is a front elevational view of the fluid coupling base of FIG. 3 with a pipe support bracket installed;

FIG. 5 is a top view showing the fluid coupling base of FIG. 4 with a pipe support bracket installed, prior to the bracket being fixed in position; and FIG. 6 is a top view of a pipe support bracket in an uncrimped configuration.

BRIEF DESCRIPTION OF THE PREFERRED EMBODIMENT

In FIGS. 1 and 2 there is shown a typical installation employing the fluid coupling of the present invention. A conventional fluid filter 10 is provided with a fluid coupling designated generally as 12 connected between a fluid line 14 and the filter 10. A tubular fluid coupling base 16, shown in detail in FIGS. 3 and 4, comprises a first end portion 18 for engagement with said the fluid filter; the first end portion 18 comprising a reduced diameter annular section for insertion into an aperture formed in the fluid filter 10. The annular end portion 18 extends in the direction of the longitudinal axis of the fluid coupling base to adjoin shoulder 20. Shoulder 20 has a larger external radius than does annular end portion 18, and acts as a stop to effectively limit entry of the fluid coupling base 16 into the fluid filter aperture.

External contacting surfaces 22 disposed between between shoulder 20 and a second end portion 24, are provided for engagement with a standard wrench type tools. Such tools are used when assembling the various portions of the fluid coupling. Second end portion 24 is provided on fluid coupling base 16 for engagement with a fluid fitting 26, of conventional design, connected to the end of fluid line 14.

The coupling base 16 has a bore 28 extending longitudinally therethrough, through which fluid may pass when fluid line 14, fluid fitting 26, and coupling base 16 sealingly engage fluid filter 10 by means of threaded bolt 30, as shown in FIG. 2.

Adjacent to second end portion 24 of coupling base 16, an annular groove 32 is positioned around the external perimeter thereof. A generally plate-like pipe support bracket 34 having a keyhole-shaped opening formed therein is mountable within groove 32 for rotational movement about the longitudinal axis of the coupling base 16. The internal radius of the keyhole-shaped opening is formed 36, as shown in FIGS. 5 and 6 with a diameter 36 corresponding to the circumference of the annular groove 32. A series of teeth 37 may be disposed about the circumference of the aperture for frictional engagement with the annular groove when the bracket is fixed into position as will be further described below. Ends 38, 40 of the keyhole-shaped opening formed therein bracket 34 are spaced apart, as shown in FIG. 5, to allow the bracket 34 a loose initial fit within the annular groove 32; said loose initial fit allows the bracket 34 to be rotated about the axis of the fluid coupling base 16, thereby permitting easy and correct movement of the bracket 34 into a supporting position relative to fluid line 14 as shown in FIGS. 1 and 2.

The bracket ends 38, 40 are configured to encompass at least a portion of the outer surface of a fluid carrying line 14, as shown in FIG. 2, when the ends 38, 40 are moved towards one another in a crimping action. The configuration of the bracket ends 38,40 may vary depending upon the shape of the particular fluid line 14.

The ends 38, 40 of the bracket 34 are movable relative to each other, and into adjacent relationship therewith as indicated in FIGS. 2, 5 and 6. This crimping-like action will act to close aperture 36 about the coupling base, thereby engaging the teeth 37 with the annular groove 32 and fixedly positioning the pipe support bracket 34 at a desired, preselected position. Additionally, as the ends 38, 40 of the pipe support bracket are moved together, the bracket ends 38,40 move into a supporting relationship with fluid line 14. The bracket design disclosed herein allows the coupling, of the instant invention, to be universally adaptable to any fluid line configuration, thus eliminating the need for the same type of fluid filter to be manufactured with multiple configurations of end fluid couplings for different applications.

To install a fluid filter having a coupling assembly of the type described above, the brackets are first rotated in to approximate position for installation using the old filter, or the fluid lines position of the particular application, as a guide. The filter is then positioned in its desired application, using standard mounting hardware, and the fluid coupling is assembled, making sure that the fluid line supporting brackets are positioned so that the bracket ends straddle the perimeter of the fluid line. Once the U-shaped pipe support brackets are in their desired configurations, the bracket ends are moved together in a crimping action, through the use of a suitable fuel, to effectively fix, thus effectively fixing the brackets in position on the fluid coupling base and in a supporting relationship to the fluid line.

While one embodiment of the invention has been described in detail above in relation to filter application, it will be apparent to those skilled in the art that the disclosed embodiment may be modified. Therefore, the foregoing description is to be considered exemplary rather than limiting, and the true scope of the invention is that defined in the following claims.

I claim:

1. A fuel filter connection for coupling a fuel line to a fuel filter, said connection comprising:
   (a) a one piece, longitudinally extending, tubular coupling base having first and second ends;
   (b) a first end porton on said coupling base configured for engagement with said filter;
   (c) external surfaces configured for engagement with standard wrench tools extending midway of said first end and said second end of said coupling base;
   (d) a second end portion on said coupling base configured for engagement with a fluid fitting connected with the fuel line;
   (e) an annular groove disposed about the external perimeter of said coupling base, adjacent to said second end;
   (f) a plate-like supporting bracket having a keyhole shaped opening formed therein, rotatably mounted in communication with said annular groove for rotation about the longitudinal axis of said coupling base;
   (g) said keyhole shaped opening in said fuel line supporting bracket having an internal radius with a diameter corresponding to the radius of said annular groove and mountable for engagement therewith;
   (h) said fuel line supporting bracket having a series of teeth formed within said internal radius for frictional engagement with said annular groove;
   (i) said fuel line supporting bracket having opposing ends separated by a distance to allow rotational movement of said bracket within said annular groove, said opposing ends being movable toward each other into adjacent relationship therewith; and
   (j) said opposing ends configured to encompass a portion of an outer surface of said fuel line, in supporting relationship therewith, when said opposing ends are moved into adjacent relationship therewith to bring said aperture of said internal radius, and said teeth disposed therein, into registry with said annular groove of said coupling base and to frictionally fix said bracket into permanent radial position about the axis of said coupling base.

2. A fluid coupling useful for coupling a fluid line to a fluid filter, said coupling comprising:
   a one piece, longitudinally extending, tubular coupling base member having a first end portion for engagement with the fluid filter, a second end portion configured for engagement with the fluid line, and an annular groove disposed about the external perimeter of said coupling base, adjacent to said second end portion;
   a support bracket of a generally plate-like configuration, having a keyhole shaped opening form therein comprising a central opening and a radially extending slot having opposing side portions extending radially outwardly from said central opening, configured to loosely engage said annular groove of said fluid coupling for rotation about the longitudinal axis of said fluid coupling, said opposing side portions adjacent to said radially extending slot movable into edge-to-edge engagement to close said slot and tighten said central opening about said annular groove of said fluid coupling base member, thereby fixing said bracket in a desired radial position relative to said coupling base member, the fluid line and the fluid filter;
   flanged end portions extending outwardly from said support bracket, formed at the ends of said opposing side portions, and haing recesses formed in opposing edges of said flanged end portions which encompass the external surface of the fluid line when said opposing side portions are moved into edge-to-edge engagement;
   and fixing means comprising a serrated edge formed about the circumference of said central opening of said support bracket, to frictionally engage said annular groove when said opposing side portions are moved into edge-to-edge engagement thereby tightening said central opening about said annular groove.

* * * * *